United States Patent [19]

Day et al.

[11] Patent Number: 4,484,122
[45] Date of Patent: Nov. 20, 1984

[54] VARIABLE POTENTIOMETER MOTOR CONTROLLER

[75] Inventors: James L. Day, Victor; Terry D. Seim, Rochester, both of N.Y.

[73] Assignee: James L. Day Co., Inc., Victor, N.Y.

[21] Appl. No.: 495,017

[22] Filed: May 16, 1983

[51] Int. Cl.³ .............................................. G05B 1/06
[52] U.S. Cl. .................................... 318/663; 318/599; 318/603
[58] Field of Search ................ 318/599, 663, 640, 603

[56] References Cited

U.S. PATENT DOCUMENTS

| | | | |
|---|---|---|---|
| 3,467,900 | 9/1969 | Benton | 318/663 X |
| 3,564,380 | 2/1971 | Zeldman | 318/663 |
| 3,581,180 | 5/1971 | Russell et al. | 318/663 X |
| 4,190,792 | 2/1980 | Chan | 318/663 |

Primary Examiner—B. Dobeck
Attorney, Agent, or Firm—Martin LuKacher

[57] ABSTRACT

A controller for operating devices adapted for motor control, such as dampers, valves and the like in a heating, ventilating and air conditioning (HVAC) system interfaces with a serial link which may carry control signals for operating a multiplicity of controllers on a time division multiple access (TDMA) basis has digital circuitry responsive to the control signals which translates them into digital signals which are stored between access times. Two series connected pluralities of resistors define, between their opposite ends and their junction points, a potentiometer which is variable by normally open and normally closed contacts which individually are connected across each resistor in each of the pluralities. The switches are operated in response to the digital signals so as to vary the resistance presented by the potentiometer between the opposite ends thereof and the junction. The potentiometer is connected as two arms in a bridge motor control circuit so as to enable the integration thereof into computer controlled HVAC systems which receive and transmit inputs and outputs along a link or bus interconnecting the computer with a multiplicity of controllers.

6 Claims, 2 Drawing Figures

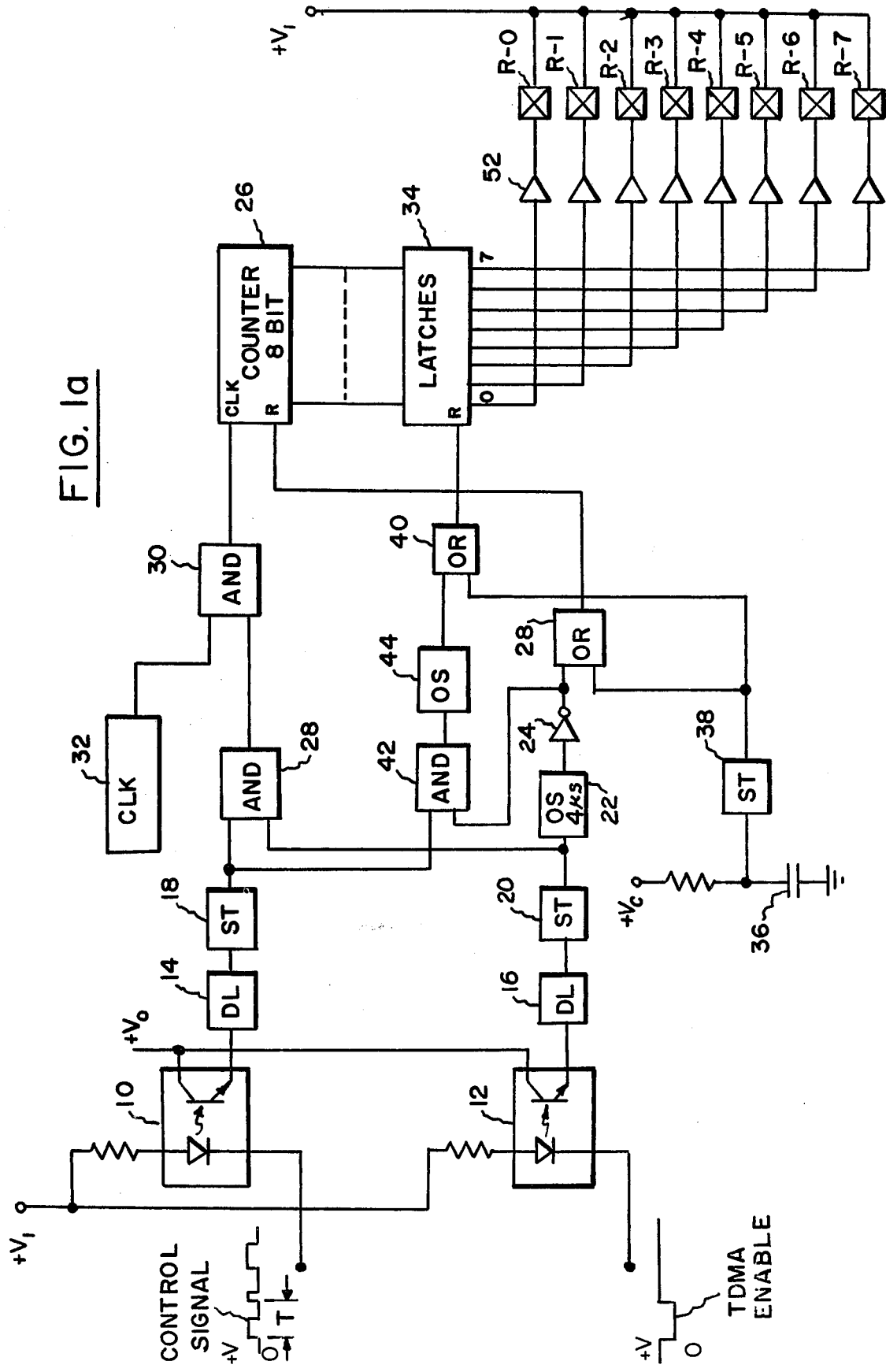

VARIABLE POTENTIOMETER MOTOR CONTROLLER

DESCRIPTION

The present invention relates to controllers which are especially adapted for use in heating, ventilating and air conditioning (HVAC) systems utilizing a computer which transmits output signals to the controllers of the HVAC system.

The invention is especially suitable for use in a system wherein control signals are transmitted on a time division multiple access (TDMA) basis so as to operate a plurality of controllers, each of which may control a different device, such as a damper or valve in the HVAC system.

HVAC systems are designed to make use of certain standard types of motor controllers for operating the valves, dampers and other movable devices in the system. Typical of such controllers is the Wheatstone bridge controller wherein resistance in control arms of the bridge is varied, as with a solenoid actuator, and the motor is connected to the wiper arm of a potentiometer in opposite arms of the bridge. The motor moves until the bridge is rebalanced. Each actuator (such as each individual solenoid) is connected or hardwired directly to a control unit, such as a computer, which responds to inputs from sensors which measure temperature, air velocity and the like and provides outputs to all of the controllers. When the controllers are hardwired to the control unit, the complexity of stringing wires between the controllers and the control units limits the number of controllers which may be used in any HVAC system. Thus, only primary loops in such systems, which control the furnace, air conditioner and the primary air flow from the furnace and air conditioner into the rest of the system, are controlled. Individual areas are not controlled by the control unit but have their own thermostats and dampers as part of independent secondary loops not connected to the primary control unit. Computer control units have the capacity to control, not only the primary but also, large number of secondary areas. The problem remains as how to interface each controller in each of the primary and secondary areas without complex hardwiring and preferably on a time division multiple access basis by a link, such as a serial link or bus which is connected between the computer control unit and each of the controllers. A further problem remains, especially in retrofitting existing HVAC installations for computer control, to utilize the existing controllers. Many of these controllers utilize Wheatstone bridges which are unbalanced and rebalanced so as to position the control device.

Accordingly, it is an object of the present invention to provide an improved controller which is adapted to interface existing equipment with a computer control unit which may be connected to the controller as well as other controllers by a common signal link.

It is another object of the present invention to provide an improved motor controller which presents a variable potentiometer output.

It is a still further object of the present invention to provide an improved controller which presents a variable potentiometer output in response to pulse type control signals which recur with different duty cycle (pulse width modulated control signals).

Briefly described, a variable potentiometer motor controller embodying the invention has circuits which respond to a recurring control signal and generate a multi-bit digital signal corresponding to the control signal when it occurs. Storage means are provided for storing this digital signal until the control signal recurs. A network defines a potentiometer having opposite ends. The network contains first and second pluralities of series connected resistors, each with an equal number of resistors and each connected between the opposite ends of the network and a common junction. Switching means are connected individually across each resistor to alternatively short circuit and open circuit the resistors in each plurality which are equidistant from the junction. The switching means are operated in response to the stored digital signal. Therefore, the resistance presented by the potentiometer between the opposite ends thereof and the junction is variable in accordance with the control signal. The potentiometer may be connected as in a Wheatstone bridge control circuit for a motor which may operate a damper, valve or other controlled device in a HVAC system. The motor is driven in opposite directions and over distances dependent upon the resistance presented by the potentiometer, since the motor will turn until the bridge is rebalanced.

The foregoing and other objects, features and advagtages of the invention, as well as a presently preferred embodiment thereof, will become more apparent from a reading of the following description in connection with the accompanying drawing which is a schematic diagram of a variable potentiometer motor controller embodying the invention.

FIG. 1a is a schematic diagram of the variable duty cycle controller.

Figure 1B:
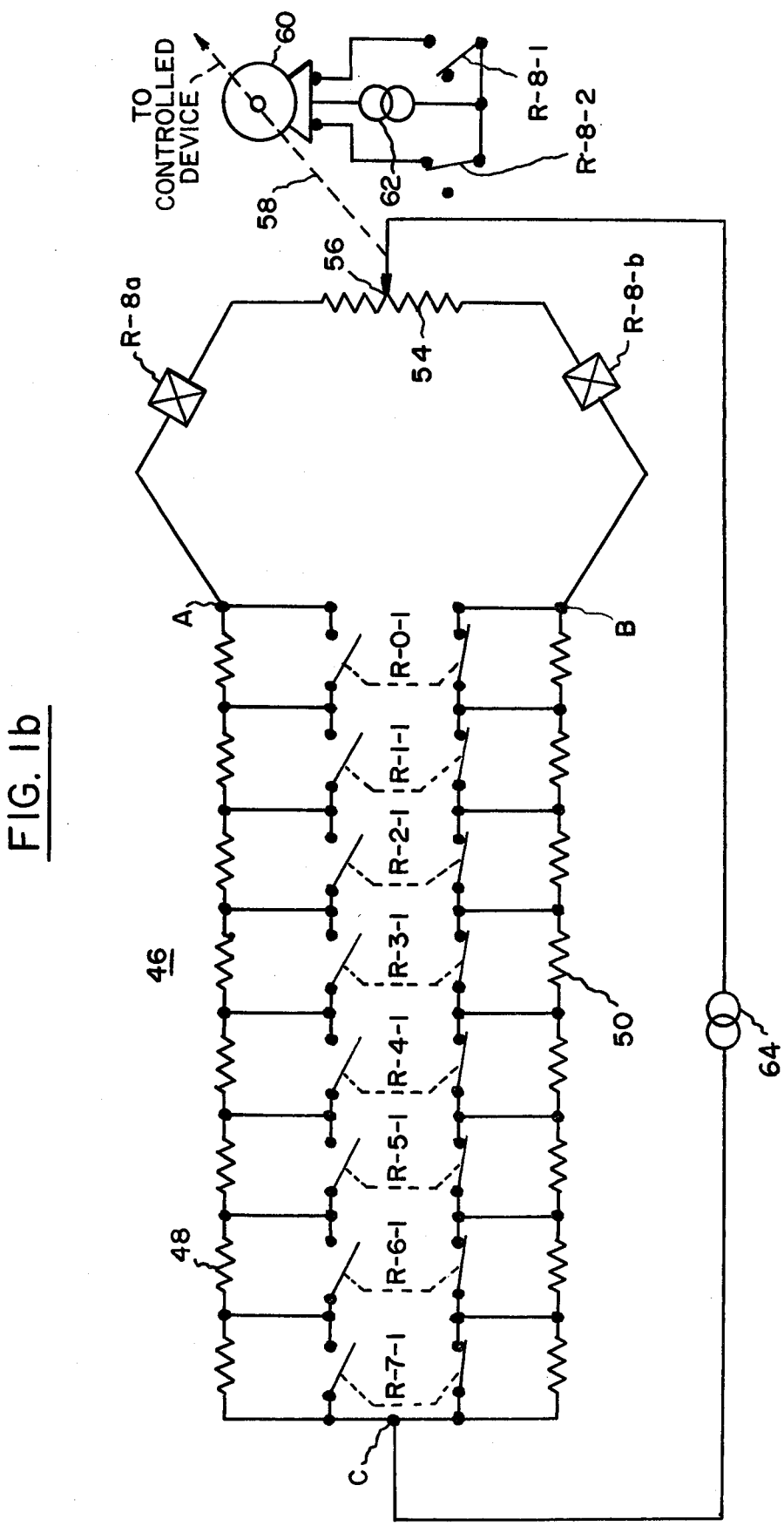
FIG. 1b is a schematic diagram of the potentiometer network.

Referring to the drawing, there is shown a variable duty cycle control signal. Three periods of like duration, "T", in which the pulse signal has different duty cycles or pulse widths are illustrated. Each period which may recur in successive cycles or repetitions of the entire control signal, is allocated to a different controller. It will be seen that the control signal is pulse width modulated in accordance with the control information. In order to provide access to the period of the control signal to which the controller shown in the drawing is intended to respond, a TDMA enable signal is derived. This TDMA signal may be derived by an interface which is connected to a control line in the cable which also carries a line along which the control signal is transmitted from the control unit or central computer. The interface may respond to addresses (multi-bit, serial digital signals) which are transmitted along the control line which carries them and translates these signals into a pulse synchronous with the period during the recurring period of the control signal which is directed to the controller illustrated in the drawing. Accordingly, only during the period indicated by the letter "T" is the TDMA enable pulse, for the illustrated controller, derived.

Two electroptical couplers (optos) 10 and 12 are responsive to the control signal and the TDMA signal, respectively. The opto 10 isolates the control signal line and the opto 12 isolates the TDMA interface from the controller. The control signal is coupled through the opto 10 to a delay circuit 14. The TDMA enable signal is coupled through the opto 12 to a delay circuit 16. Because of the polarity and phasing of the control signal with respect to the TDMA enable, the leading edge of the TDMA enable occurs before the control signal pulse at the outputs of the optos 10 and 12. The delay circuits 14 and 16, which may be RC integrating circuits of different time constant, assure that the control and TDMA enable signals are properly aligned in time. Schmitt trigger circuits 18 and 20 shape the pulses corresponding to the control and TDMA enable signals. The TDMA enable, from the Schmitt trigger 20, is applied to a one-shot 22 to produce a short pulse relative to the period, T, of the control and TDMA enable signals (e.g., 4 millisec. as compared to 5 seconds). This short pulse is applied to a buffer amplifier 24 with necessary inversion to the reset input of an 8 bit counter 26 via an OR gate 28. Thus, at the beginning of the period T the counter 26 is reset.

An AND gate 28 is enabled by the TDMA enable signal from the Schmitt trigger 20 and passes the control signal to another AND gate 30. The gate 30 allows clock pulses from a clock pulse source 32 to be applied to the clock input of the counter 26. The frequency of the clock source 32 is greater than 256 divided by the duration of the period T, such that the counter 26 will count to full count (256) when the duty cycle of the control signal is 100%.

The digital signal developed by the counter 26 is stored in latches 34. The latches are reset on power up (when the controller is turned on) and each time the control signal for the controller which is enabled by the TDMA enable recurs. The power up reset is developed by an RC circuit 36 which is connected to the operating voltage $V_c$ from the power supply which is turned on when the controller is put into operation. The increasing voltage across the RC circuit is translated into a pulse by a Schmitt trigger circuit 38 and applied to the reset input of the latches 34 via an OR gate 40. The power up pulse is also used to reset the counter 26 via the OR gate 28. At the end of the control signal pulse, during the period where the controller is given access to the control signal link (the falling or lagging edge of the pulse from the Schmitt trigger 18), an AND gate 42 is enabled. At the time of enablement, a one-shot 44 produces a reset pulse which is applied via the OR gate 40 to the reset input of the latches 34. The latches are then all reset to zero, and after the reset pulse, the digital signal which is developed in the counter 26 is transferred to the latches. There is sufficient time after the TDMA enable for the counter 26 and the latches 34 to stabilize. The digital signal stored in the latches controls a potentiometer network 46.

The potentiometer network 46 has opposite ends indicated at A and B and a common junction or virtual wiper C. Different pluralities of resistors 48 and 50 are connected in series between the opposite ends A and B and the junction C. The series connected resistors, which are equidistant from the junction, have like values of resistance. The latches 34 are connected through buffer amplifiers 52 to the operating windings of relays, R-0 through R-7. The contacts of these relays (each relay having a normally open and a normally closed contact) are R-0-1 through R-7-1 and are connected across the individual resistors in the first and second pluralities 48 and 50. The switches are shown positioned as when the multi-bit digital signal in the latches 34 are all zeros. When the value of the bit changes from a "0" to a "1", the position of the switches alternates. Accordingly, the resistance across the potentiometer from the junction to the opposite ends thereof is varied. The total resistance between the opposite ends A and B of the potentiometer 46 always stays the same.

The potentiometer is connected as two of the adjacent arms of the four arms of a Wheatstone bridge motor control circuit. The remaining arms contain a potentiometer 54 with a wiper 56 which is connected mechanically, as illustrated by the dashed line 58, to a motor 60. This motor 60 operates the control device, such as a valve or damper or the like. Operating windings R-8-a and R-8-b in the arms including the potentiometer 54 operate contacts R-8-1 and R-8-2 which apply current in different directions through the motor 60 from a source of motor current 62. Potential is applied to the bridge from a source 64 which is connected between the wiper 56 and the junction C of the potentiometer 46. When the bridge is balanced, the current through the relay operating windings R-8-a and R-8-b are equalized and the contacts R-8-1 and R-8-2 remain open. The motor 60 then is stopped. When the bridge becomes unbalanced, which occurs when the resistance presented by one of the pluralities 48 of resistors in the potentiometer 46 becomes different from the resistance presented by the other plurality 50 of resistors in response to the digital signal stored in the latches 34, current in one of the windings R-8-a or R-8-b becomes greater than the current in the other. In the drawing the current through R-8-b is greater than the current through R-8-a. Then, contact R-8-2 closes, while R-8-1 remains open. The motor 60 then turns and moves the wiper 56 of the potentiometer 54 in a direction to tend to rebalance the bridge. When balance occurs, the motor stops. The direction of movement and the displacement of the motor depend upon the change in resistance in the potentiometer 46. It will therefore be seen that the controller utilizing the variable potentiometer interfaces with the data link carrying the control and TDMA enable signals and with the computer which generates these signals so as to control existing devices with minimal modification.

Variations and modifications of the hereindescribed controller, within the scope of the invention, will undoubtedly suggest themselves to those skilled in the art. Accordingly, the foregoing description should be taken as illustrative and not in a limiting sense.

We claim:

1. A variable potentiometer motor controller which comprises means responsive to a recurring control signal for generating a multi-bit digital signal, means for storing said digital signal until said control signal recurs, a network defining a potentiometer having opposite ends and containing a first plurality and a second plurality of series connected resistors, said first and second pluralities of resistors having an equal number of resistors and being connected between said opposite ends of said network and a common junction, the resistors in said first and second pluralities equidistant from said junction being of like resistance, switching means connected individually across each resistor in said first and second pluralities of resistors for alternatively presenting short circuits across said resistors in said first plurality and open circuits across said resistors in said second plurality, and means for operating said switching means which are connected across said resistors in said first and second pluralities which are equidistant from said junction conjointly in response to different bits of said digital signal which are stored in said storing means for varying the resistance between said opposite ends and said junction while maintaining the resistance between said opposite ends constant, and means for applying control current to a motor in response to the resistance presented by said potentiometer between opposite ends of said network and said junction to operate said motor to move selected distances in opposite directions.

2. The motor controller according to claim 1 wherein said motor control current supplying means comprises a bridge, having four arms with said first and second pluralities of resistors in a first pair of adjacent arms of said bridge, a second potentiometer having a wiper defining a second pair of said arms of said bridge, means connected to said bridge applying current to said motor depending upon the balance of said bridge, said motor being mechanically connected to said wiper and movable in a direction to balance said bridge when the resistance of said first and second pluralities of resistors varies.

3. The motor controller according to claim 2 further comprising means for applying voltage to said bridge between said wiper and said junction, and relay means connected in one of said first and second pairs of arms for controlling the application of current to said motor.

4. The motor controller according to claim 1 wherein said control signal is a train of pulses of varying duty cycle each occurring in successive periods of time and an enable signal synchronous with selected ones of said periods of time, said control signal responsive means including a counter, a source of clock pulses having a frequency higher than the frequency of said control signal pulses, means for enabling said counter to count said clock pulses when said enable signal is present to generate said digital signal corresponding to the duty cycle of said pulses, said storing means being connected to said counter to store said digital signal.

5. The motor controller according to claim 4 further comprising latches providing said storing means, and means for resetting said latches and said counter after said enable signal.

6. The motor controller according to claim 1 wherein said switching means comprises relays each having an operating winding and a normally closed and normally open contact, means for operating said relays each in response to a different bit of said digital signal in storing means, said normally open contacts being connected across said resistors in said first plurality and said normally closed contacts being connected across said resistors in said second plurality.

* * * * *